United States Patent
Kruse et al.

(10) Patent No.: US 10,371,030 B2
(45) Date of Patent: Aug. 6, 2019

(54) DIESEL EXHAUST FLUID SYSTEM

(71) Applicant: Deere & Company, Moline, IL (US)

(72) Inventors: Ryan Kruse, Moline, IL (US); Francis J. Lahey, Moline, IL (US); Mark D. Benedict, Moline, IL (US); Douglas J. Send, Moline, IL (US); Paul Wantschik, Moline, IL (US); Eric Nohr, Moline, IL (US); Paul Riffel, Moline, IL (US); Jonathan Copeland, Moline, IL (US)

(73) Assignee: DEERE & COMPANY, Moline, IL (US)

( * ) Notice: Subject to any disclaimer, the term of this patent is extended or adjusted under 35 U.S.C. 154(b) by 188 days.

(21) Appl. No.: 15/282,436

(22) Filed: Sep. 30, 2016

(65) Prior Publication Data

US 2018/0094562 A1 Apr. 5, 2018

(51) Int. Cl.
*F01N 3/20* (2006.01)
*B01D 53/94* (2006.01)

(52) U.S. Cl.
CPC ......... *F01N 3/206* (2013.01); *B01D 53/9431* (2013.01); *B01D 53/9495* (2013.01); *F01N 3/2066* (2013.01); *F01N 2560/12* (2013.01); *F01N 2610/10* (2013.01); *F01N 2610/1406* (2013.01); *F01N 2610/148* (2013.01); *F01N 2610/1433* (2013.01); *F01N 2610/1473* (2013.01); *F01N 2900/1814* (2013.01); *F01N 2900/1818* (2013.01); *Y02A 50/2325* (2018.01); *Y02T 10/24* (2013.01)

(58) Field of Classification Search
CPC ... F01N 3/206; F01N 3/2066; B01D 53/9431; B01D 53/9495
See application file for complete search history.

(56) References Cited

U.S. PATENT DOCUMENTS

| 7,647,767 | B2 | 1/2010 | Osaku et al. |
| 7,836,684 | B2 | 11/2010 | Starck et al. |
| 8,184,964 | B2 | 5/2012 | Haeberer et al. |

(Continued)

FOREIGN PATENT DOCUMENTS

| DE | 102004051746 | 4/2006 |
| DE | 102006046899 | 4/2008 |
| DE | 102006046900 | 4/2008 |

OTHER PUBLICATIONS

English translation of DE102004051746 (Year: 2006).*

(Continued)

*Primary Examiner* — Regina M Yoo
(74) *Attorney, Agent, or Firm* — Michael Best & Friedrich LLP

(57) ABSTRACT

An exhaust gas purification system includes a tank for storing a fluid and a mounting plate coupled to the tank. A baffle is positioned inside the tank below the mounting plate. The baffle has an outer wall defining an interior cavity and an opening. A sensor is positioned in the interior cavity for detecting a condition of the fluid. A supply conduit extends through the mounting plate into the tank. A return conduit extends through the mounting plate into the tank and has an outlet positioned to discharge a return fluid below the opening and exterior to the baffle and the interior cavity.

19 Claims, 7 Drawing Sheets

(56) References Cited

U.S. PATENT DOCUMENTS

| | | |
|---|---|---|
| 9,248,390 B2 | 2/2016 | Hudgens et al. |
| 9,376,950 B2 | 6/2016 | Ogawa et al. |
| 9,377,441 B2 | 6/2016 | Reimer et al. |
| 9,468,875 B2 | 10/2016 | Cassidy et al. |
| 9,535,038 B2 | 1/2017 | Reimer et al. |
| 2008/0307967 A1* | 12/2008 | Coates ............ B01D 53/90 95/193 |
| 2009/0139214 A1* | 6/2009 | Reed ............ F01N 3/2066 60/286 |
| 2015/0033700 A1 | 2/2015 | Schlenke |
| 2015/0218990 A1 | 8/2015 | Hudgens |
| 2015/0240683 A1 | 8/2015 | Hudgens et al. |
| 2017/0122170 A1* | 5/2017 | Fahrenkrug ......... B01D 29/114 |

OTHER PUBLICATIONS

Search Report from the German Intellectual Property Office for Application No. 102017207068.4 dated Sep. 27, 2017 (9 pages, which includes a Statement of Relevance).

\* cited by examiner

DIESEL EXHAUST FLUID SYSTEM

FIELD

Various exemplary embodiments relate to a system for conditioning exhaust in an internal combustion engine.

BACKGROUND

Diesel engines are the preferred means of producing torque for use in a wide range of applications ranging from transportation, such as heavy-duty trucks and trains, off-road agricultural and mining equipment, to the large scale production of on-site electrical power. Diesel engines operate at high internal temperatures that can result in at least some of the nitrogen present in the engine at the moment of combustion combining with oxygen to form nitrogen oxides (including NO and $NO_2$). Nitrogen oxides readily combine with volatile organic compounds in the atmosphere to form smog and are regarded as a pollutant. Virtually every industrialized nation regulates the levels of nitrogen oxides that can be legally discharged into the atmosphere.

The emission of nitrogen oxides can be reduced, for example using selective catalytic reduction (SCR) which includes dosing a reductant (generically, diesel exhaust fluid (DEF)) into engine exhaust prior to its exposure to a catalyst. The DEF reduces nitrogen oxide emissions by converting the nitrogen oxides to byproducts that are less toxic. Typical exhaust systems can incorporate a control system for injecting the DEF from a tank or reservoir into the exhaust.

SUMMARY

According to an exemplary embodiment, an exhaust gas purification system includes a tank for storing a fluid. A mounting plate is coupled to the tank. A baffle is positioned inside the tank below the mounting plate. The baffle has an outer wall defining an interior cavity and an opening. A sensor is positioned in the interior cavity for detecting a condition of the fluid. A supply conduit extends through the mounting plate into the tank. A return conduit extends through the mounting plate into the tank and has an outlet positioned to discharge a return fluid below the opening and exterior to the baffle and the interior cavity.

According to another exemplary embodiment, an exhaust gas purification system includes a tank for storing a fluid. A baffle is positioned inside the tank. The baffle has an outer wall defining an interior cavity and an opening. A sensor is positioned within the interior cavity for detecting a condition of the fluid. A supply conduit extends into the tank. A return conduit extends into the tank and has an outlet positioned to discharge the fluid below the opening and away from the interior cavity.

According to another exemplary embodiment, an exhaust gas purification system includes an injector for introducing a fluid into an exhaust stream, a supply device to supply fluid to the injector, and a tank for storing the fluid. A baffle is positioned inside the tank, the baffle having an outer wall defining an interior cavity and an opening. A sensor is positioned in the interior cavity for detecting a condition of the fluid. A supply conduit extends into the tank to supply fluid from the tank to the supply device. A return conduit extends into the tank to return fluid from the supply device to the tank. The return conduit extends through the upper opening and through the outer wall of the baffle and has an outlet positioned to discharge the fluid outside of the baffle.

BRIEF DESCRIPTION OF THE DRAWINGS

The aspects and features of various exemplary embodiments will be more apparent from the description of those exemplary embodiments taken with reference to the accompanying drawings, in which.

DETAILED DESCRIPTION OF EXEMPLARY EMBODIMENTS

Figure 1:
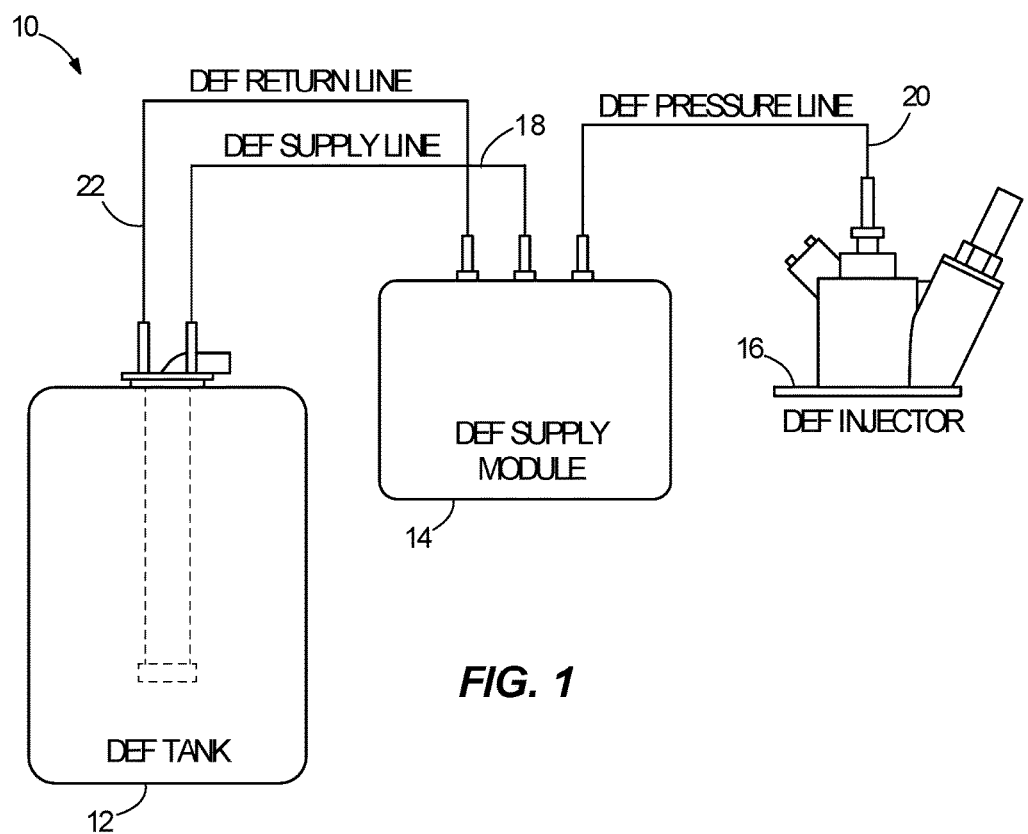
FIG. 1 is a schematic of an exemplary diesel exhaust fluid supply system.

FIG. 1 shows an exemplary embodiment of a DEF delivery system 10 that includes a tank 12 for storing the DEF fluid and a supply module 14 for pumping the DEF fluid from the tank 12 and delivering it to an injector 16. A supply line 18 provides fluid to the supply module 14 from the tank 12 and a pressure line 20 provides fluid from the supply module 14 to the injector 16. The supply module 14 meters a specific amount of DEF fluid to the injector 16 based on the engine requirements, and any unused DEF fluid is returned to the tank 12 via a return line 22.

FIGS. 2-9 show an exemplary embodiment of a tank 110 for use with a DEF delivery system and an insert 112 that extends into the tank 110. The tank 110 has a plurality of outer walls 114 that define a chamber 116 for retaining the DEF fluid. The insert 112 includes a plate 118, a baffle 120, and one or more fluid conduits and sensor components, examples of which are described below. The size, shape, and configuration of the tank 110 and the different insert components can be varied depending on the type of vehicle and the engine requirements.

Figure 2:
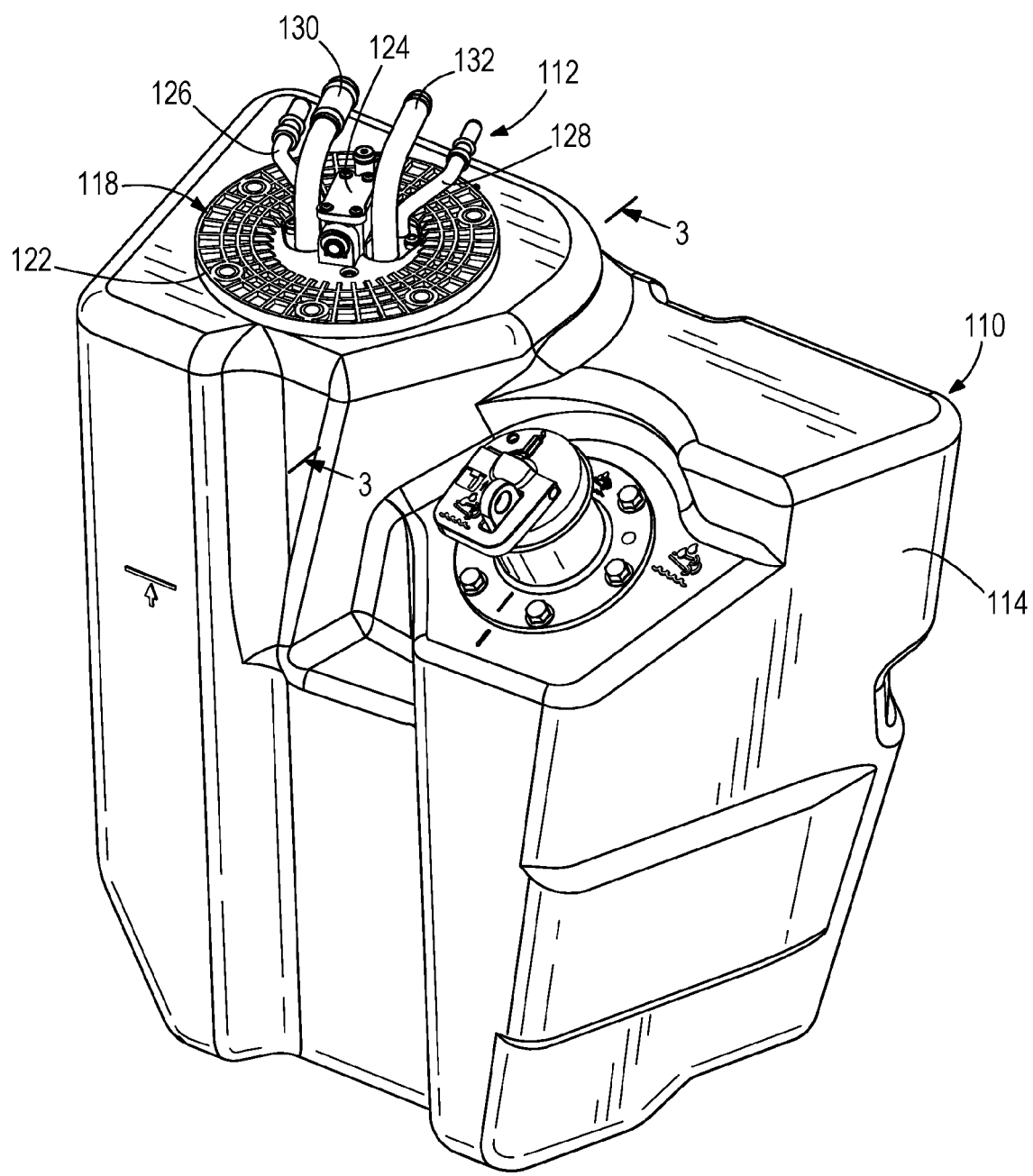
FIG. 2 is a perspective view of an exemplary diesel exhaust fluid tank and insert.
Figure 3:
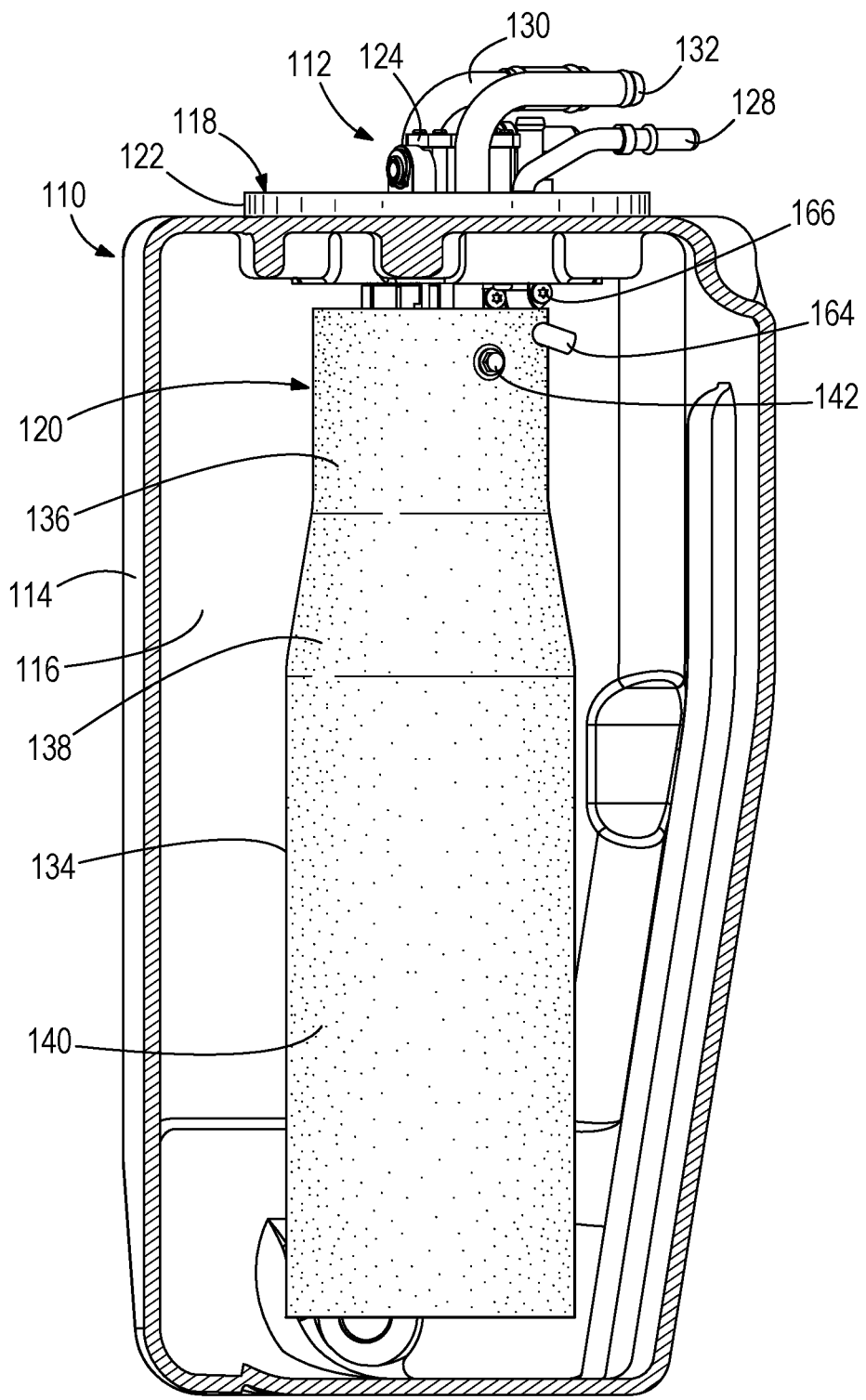
FIG. 3 is a sectional view of FIG. 2 taken along line 3-3.
Figure 4:
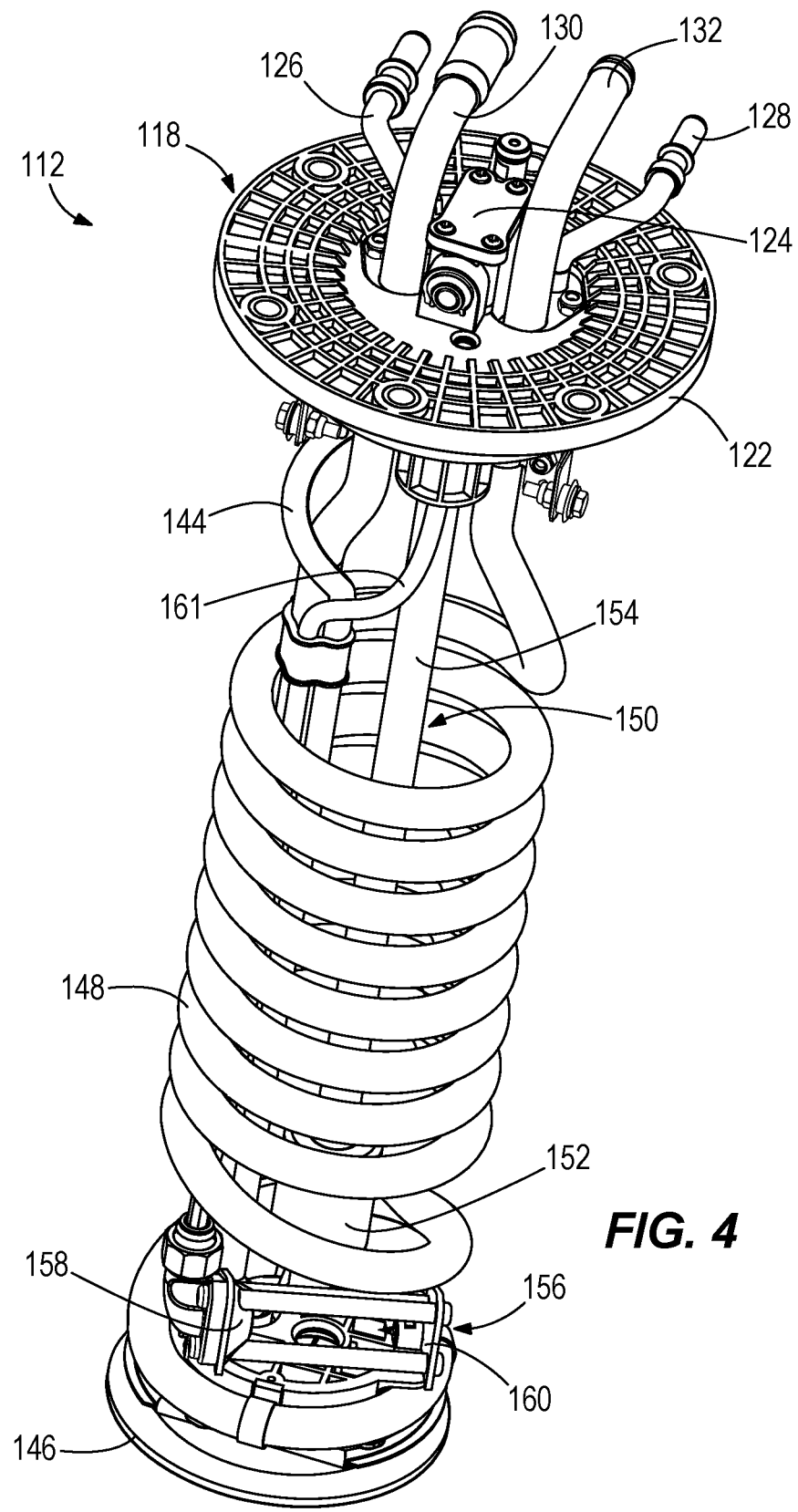
FIG. 4 is a top perspective view of the insert of FIG. 1 with the baffle removed.

As best shown in FIGS. 2 and 3, the plate 118 has an upper flange 122 resting at least partially on an outer surface of the tank 110 or a gasket positioned on the thank. The plate 118 also includes an upper housing 124 positioned substantially in the center of the plate 118 and a set of openings that position conduits passing through the plate 118 and into the tank 110. According to an exemplary embodiment, the conduits include a fluid supply line 126, a fluid return line 128, a heating fluid inlet 130, and a heating fluid outlet 132. Hosing, tubing, or other piping members (not shown) can be connected to the conduits to bring fluid to or from other downstream or upstream components.

As shown in FIG. 3, the baffle 120 extends into the tank 110 below the plate 118 and has an outer wall 134 that defines an interior cavity having an upper opening. The baffle 120 includes an upper section 136, a central section 138, and a lower section 140. In the exemplary embodiment shown, the upper section 136 is narrower than the central section 138 and the lower section 140, although the sections can have a constant diameter. The baffle 120 is held in place by one or more fasteners 142, that can connect the baffle 120 to the plate 118 or other components, for example by a bracket. Connection by the fasteners 142 can also cause a narrowing or bunching of the baffle material 120. In an exemplary embodiment, the baffle 120 is made from a porous material, for example a non-woven felt made from polypropylene. The size of the pores and the type of material can be varied, as well as the size, shape, and configuration of the baffle 120, depending, for example, on the fluid and the engine requirements.

FIGS. 4-7 show a set of exemplary components that are positioned in the internal cavity of the baffle 120. The components can include extensions of the fluid conduits extending through the plate 118. For example, the supply conduit 126 has a lower portion 144 that extends into the internal cavity of the baffle 120. An opening in the lower portion 144 of the supply conduit 126 allows the DEF fluid to flow from the internal cavity to one or more downstream components. A filter 146 can also be positioned in or below the internal cavity to filter the DEF entering the supply conduit 126. In exemplary embodiment, the baffle 120 can connect to or extend around at least a portion of the filter 146. The heating fluid inlet and outlet 130, 132 are connected to a heating coil 148 that extends in a spiral fashion inside of the baffle 120.

The internal components can also include one or more sensors. For example, a level sensor 150 having a float 152 moveably connected to a stem 154 extends below the plate 118 and can include a conductor (not shown) extending into the housing 124 to provide signals to a control unit (not shown). A fluid concentration sensor 156 includes a piezoelectric ultrasonic transducer 158 and a reflector 160. The transducer 158 acts as both an emitter and receiver. The piezoelectric element vibrates to create an acoustic signal, which moves through the fluid toward the reflector 160. The signal reflects off of the reflector 160 and travels back toward the transducer 158. The time-of-flight of the signal can be output to a control unit, for example via a conductor that extends through a sensor conduit 161 to the junction housing 124. The time-of-flight signal is used to measure the concentration of the fluid, for example determining the presence of any contaminants. If contaminants are found, an alert can be sent to an operator. Contaminants can include other fluids, such as water, diesel, antifreeze, and oil, or solids, such as dust and other debris. The heating coil 148 can extend at least partially around the concentration sensor 156, and can combine with the baffle to limit or restrict the impact of frozen fluid particles on the accuracy of the concentration sensor 156 readings.

Figure 5:
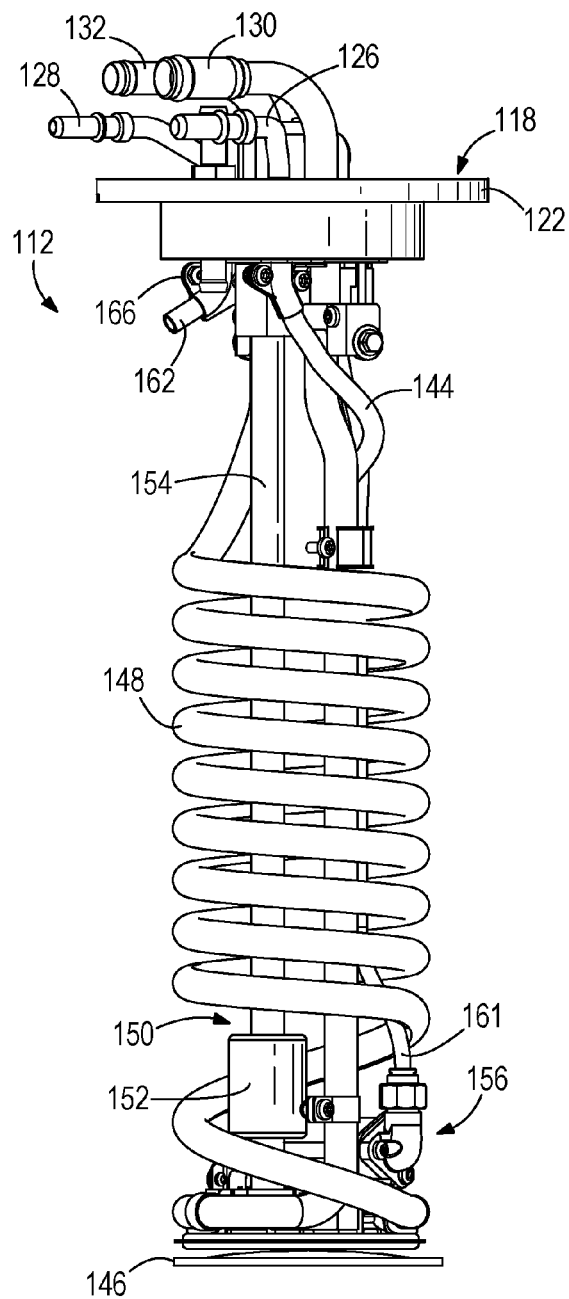
FIG. 5 is a right-side perspective view of FIG. 4.
Figure 6:
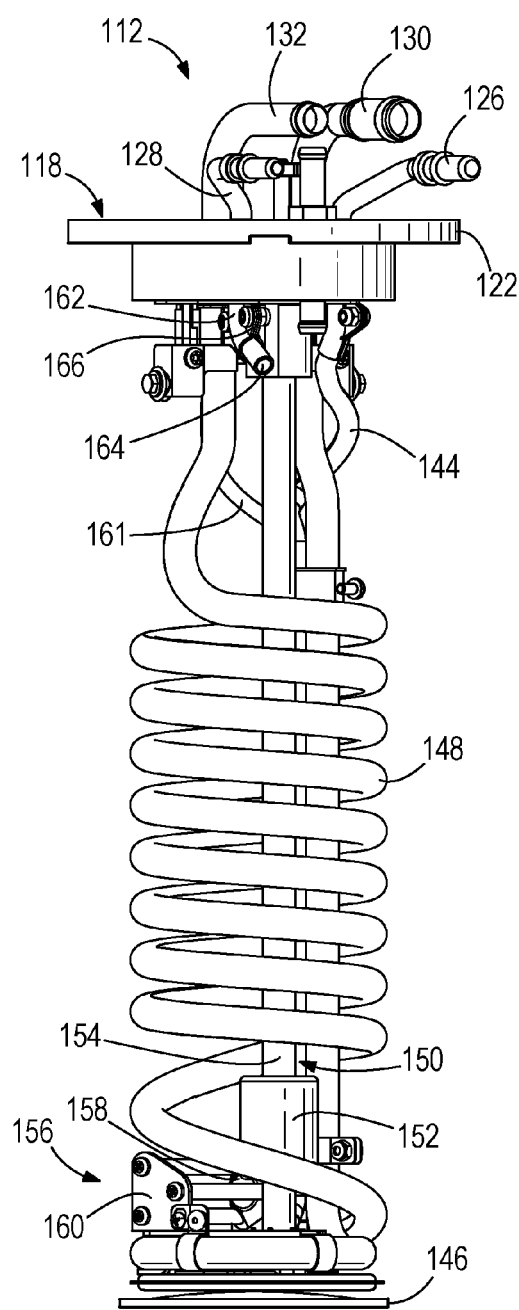
FIG. 6 is a left-side perspective view of FIG. 4.
Figure 7:
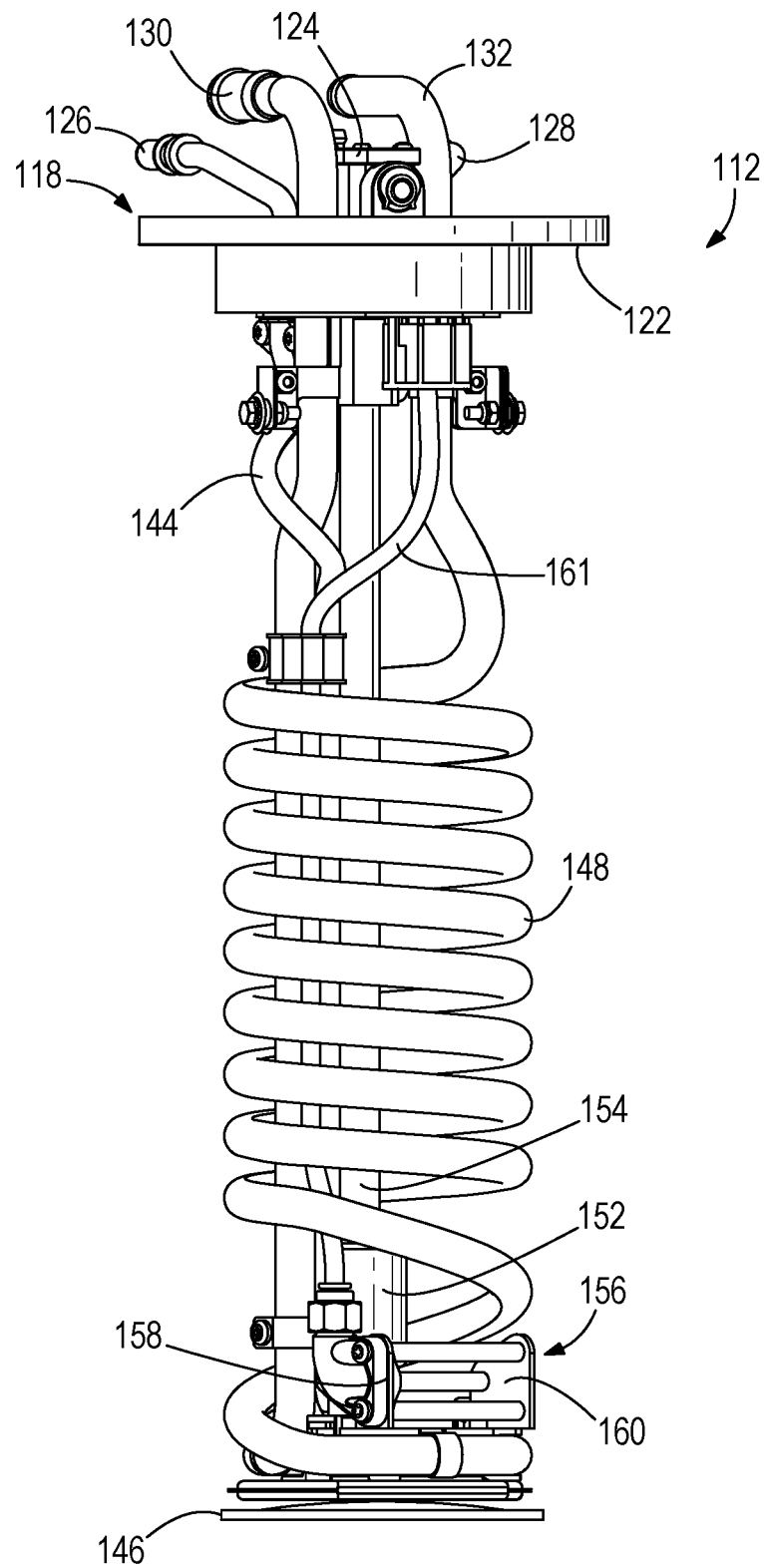
FIG. 7 is a rear perspective view of FIG. 4.
Figure 9:
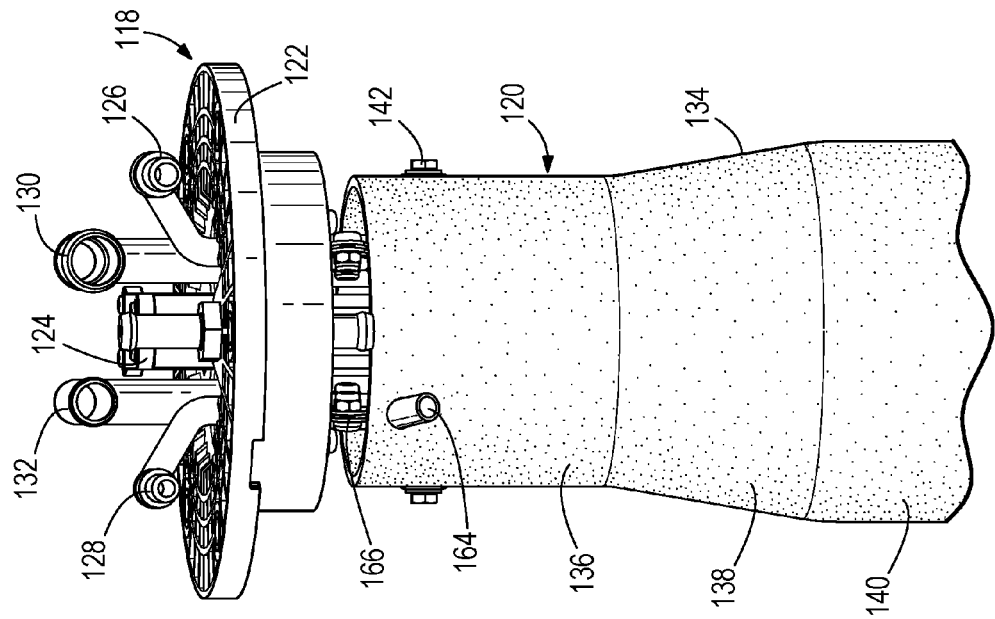
FIG. 9 is a front perspective, partial view of the insert showing the return tube extending through the baffle.
Figure 8:
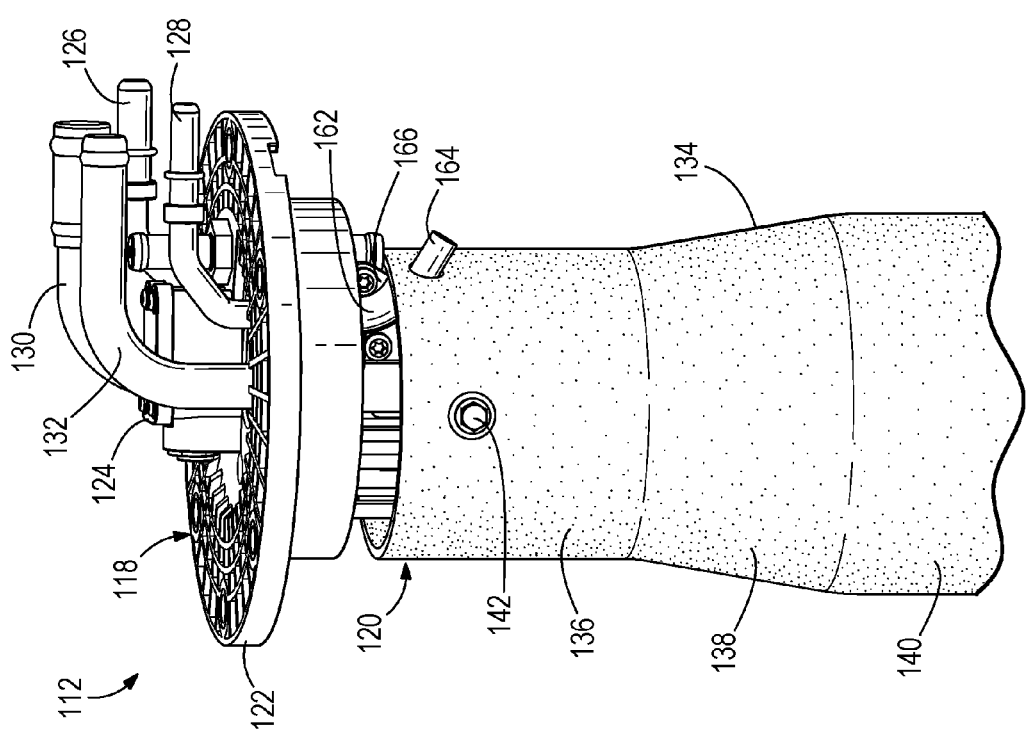
FIG. 8 is a side perspective, partial view of the insert showing the return tube extending through the baffle.

As best shown in FIGS. 5 and 6, the return line 128 extends below the plate 118 and includes a first section 162 and a second section 164 extending at an angle from the first section 162. The first and second sections 162, 164 can be connected by an elbow portion that bends the first section 162 away from the second section 164. A bracket 166 assists in positioning and retaining the return line 128, although other fasteners and supports can be used. As best shown in FIGS. 8 and 9, the return line 128 extends through the baffle 120 to provide an outlet for the return fluid that is outside the internal cavity of the baffle 120. An opening or slit can be provided in the baffle 120 for receiving the return line 128. In the exemplary embodiment, the angled second section 164 extends through the baffle 120 to direct the flow of the return line away from the baffle 120 and the internal cavity.

In operation, DEF fluid from the tank 110 is pumped as needed from the interior cavity of the baffle 120 through the fluid supply line 126 and to a downstream component, for example the DEF supply module 14 shown in FIG. 1. Any DEF fluid not delivered to the exhaust stream is returned to the tank 110 through the return line 128. The DEF fluid retuning to the tank 110 can be aerated, and therefore can introduce air into the DEF fluid stored in the tank 110. The introduction of air can cause inaccuracies with the readings from the fluid concentration sensor 156 by impacting the strength of the signal and the signal time-of-flight. By extending the return line 128 through the baffle 120, air is prevented from impacting the concentration sensor 156. Any air present in the fluid is dissipated before reaching the sensor 156 and the baffle 120 can assist in preventing aerated fluid from entering the internal cavity, leading to more accurate and consistent concentration readings during use. Additionally, the DEF return fluid can have a different temperature than the fluid stored in the tank 110, resulting in temperature fluctuations when the fluid is returned. These temperature fluctuations can also cause inaccurate sensor readings. By having the return line 128 extending through the baffle 120, temperature fluctuations at the concentration sensor 156 are reduced or eliminated.

The foregoing detailed description of the certain exemplary embodiments has been provided for the purpose of explaining the general principles and practical application, thereby enabling others skilled in the art to understand the disclosure for various embodiments and with various modifications as are suited to the particular use contemplated. This description is not necessarily intended to be exhaustive or to limit the disclosure to the exemplary embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

As used in this application, the terms "front," "rear," "upper," "lower," "upwardly," "downwardly," and other orientational descriptors are intended to facilitate the description of the exemplary embodiments of the present disclosure, and are not intended to limit the structure of the exemplary embodiments of the present disclosure to any particular position or orientation. Terms of degree, such as "substantially" or "approximately" are understood by those of ordinary skill to refer to reasonable ranges outside of the given value, for example, general tolerances associated with manufacturing, assembly, and use of the described embodiments.

What is claimed:

1. An exhaust gas purification system comprising:
   a tank for storing a fluid;
   a baffle positioned inside the tank, the baffle having an outer wall defining an interior cavity and an upper opening;
   a sensor positioned within the interior cavity for detecting a condition of the fluid;
   a supply conduit extending into the tank; and
   a return conduit extending into the tank and having an outlet positioned to discharge the fluid below the upper opening and away from the interior cavity,
   wherein the return conduit extends through the upper opening and through the outer wall of the baffle.

2. The exhaust gas purification system of claim 1, wherein the return conduit includes a first section positioned in the tank and a second section extending at an angle relative to the first section and through the outer wall of the baffle.

3. The exhaust gas purification system of claim 1, wherein the supply conduit extends into the interior cavity of the baffle.

4. The exhaust gas purification system of claim 1, wherein the baffle includes a fabric material.

5. The exhaust gas purification system of claim 1, wherein the sensor is configured to detect the concentration of the fluid.

6. The exhaust gas purification system of claim 1, further comprising a heater component positioned at least partially inside of the interior cavity of the baffle.

7. An exhaust gas purification system comprising:
a tank for storing a fluid;
a mounting plate coupled to the tank;
a baffle positioned inside the tank below the mounting plate, the baffle having an outer wall defining an interior cavity and an opening;
a sensor positioned in the interior cavity for detecting a condition of the fluid;
a supply conduit extending through the mounting plate into the tank; and
a return conduit extending through the mounting plate into the tank and having an outlet positioned to discharge the fluid below the opening and exterior to the baffle.

8. The exhaust gas purification system of claim 7, wherein the return conduit extends through the opening and through the outer wall of the baffle.

9. The exhaust gas purification system of claim 8, wherein the baffle includes an upper portion and a lower portion, and wherein the return conduit extends through the upper portion of the baffle.

10. The exhaust gas purification system of claim 7, further comprising a level sensor positioned within the interior cavity of the baffle.

11. The exhaust gas purification system of claim 7, further comprising a heating coil positioned in the interior cavity of the baffle and having an inlet and an outlet extending through the mounting plate.

12. The exhaust gas purification system of claim 7, wherein the sensor is configured to detect the concentration of the fluid using a piezoelectric device.

13. The exhaust gas purification system of claim 7, wherein the baffle includes a porous material.

14. An exhaust gas purification system comprising:
an injector for introducing a fluid into an exhaust stream;
a supply device to supply the fluid to the injector;
a tank for storing the fluid;
a baffle positioned inside the tank, the baffle having an outer wall defining an interior cavity and an opening;
a sensor positioned in the interior cavity for detecting a condition of the fluid;
a supply conduit extending into the tank to supply the fluid from the tank to the supply device; and
a return conduit extending into the tank to return the fluid from the supply device to the tank, the return conduit extending through the opening and through the outer wall of the baffle and having an outlet positioned to discharge the fluid outside of the baffle.

15. The exhaust gas purification system of claim 14, wherein the baffle includes an upper portion having a first diameter and a lower portion having a second diameter larger than the first diameter, and wherein the return conduit extends through the upper portion of the baffle.

16. The exhaust gas purification system of claim 14, further comprising a heating coil positioned in the interior cavity of the baffle and a level sensor positioned in the interior cavity of the baffle.

17. The exhaust gas purification system of claim 14, wherein the sensor is configured to detect the concentration of the fluid using a piezoelectric device.

18. The exhaust gas purification system of claim 14, wherein the baffle includes a non-woven fabric material having an opening for receiving the return conduit.

19. The exhaust gas purification system of claim 14, wherein the injector, supply device, and tank are positioned on an industrial vehicle.

* * * * *